United States Patent [19]
Ross et al.

[11] Patent Number: 5,544,731
[45] Date of Patent: Aug. 13, 1996

[54] AGITATING APPLE ORIENTOR

[75] Inventors: Edward E. Ross, San Rafael; Konrad E. Meissner, Lafayette, both of Calif.

[73] Assignee: Atlas Pacific Engineering Company, Pueblo, Colo.

[21] Appl. No.: 410,678

[22] Filed: Mar. 27, 1995

[51] Int. Cl.[6] .................................................. B65G 47/24
[52] U.S. Cl. ............................................................ 198/387
[58] Field of Search ...................................... 198/384–387

[56] References Cited

U.S. PATENT DOCUMENTS

| | | | |
|---|---|---|---|
| 2,909,270 | 10/1959 | Hait | 198/384 |
| 3,080,955 | 3/1963 | Fennell | 198/387 |
| 3,096,870 | 7/1963 | Miller | 198/387 |
| 3,137,383 | 6/1964 | Chamberlin | 198/387 |
| 4,033,450 | 7/1977 | Paddock et al. | 198/387 X |
| 4,872,564 | 10/1989 | van der Schoot | 198/387 X |

*Primary Examiner*—James R. Bidwell
*Attorney, Agent, or Firm*—Bruce H. Johnsonbaugh

[57] ABSTRACT

An apple orienting apparatus is provided wherein one or more agitating spools are utilized to constantly agitate and rotate an apple until it is properly oriented. The agitator spools are mounted in an eccentric or off-center fashion to produce a wobble or eccentric motion in addition to rotational motion. The mechanism is especially useful with elongated apples but also is effective in orienting relatively round apples as well.

8 Claims, 5 Drawing Sheets

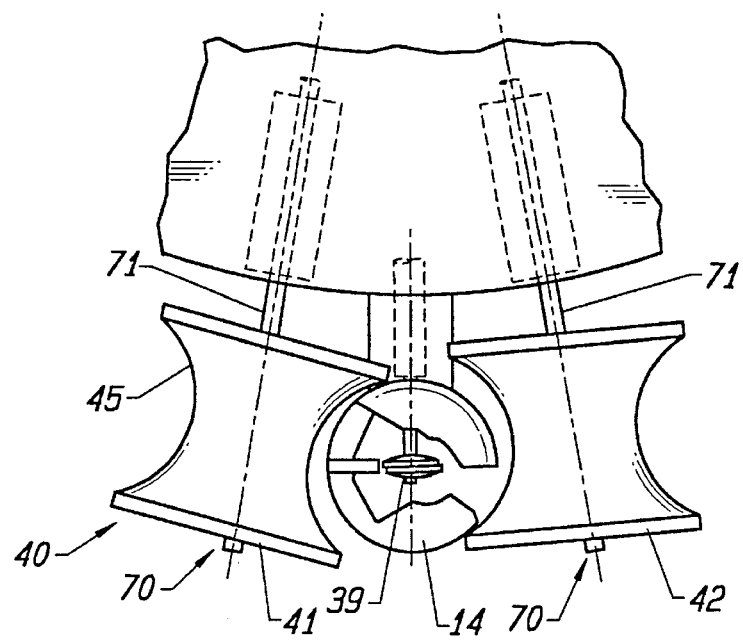
FIG. 2
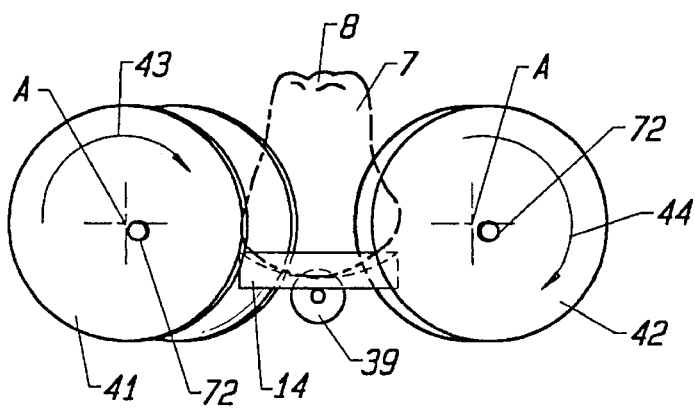
FIG. 3
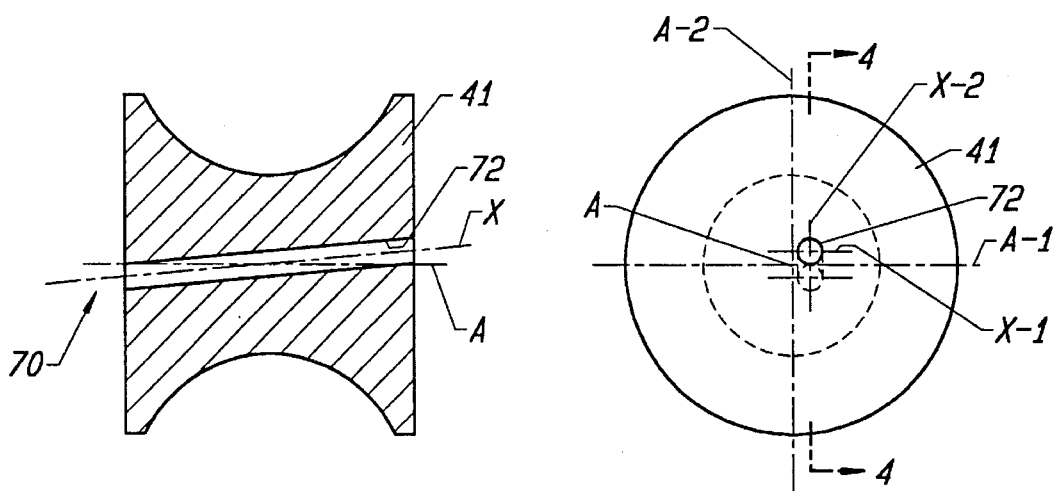
FIG. 4
FIG. 5

AGITATING APPLE ORIENTOR

BACKGROUND OF THE INVENTION

The present invention relates in general to an apple orienting device and, more particularly, to a device capable of orienting elongated apples.

The general purpose of an apple orienting apparatus is to position each apple so that it is at rest with its core extending vertically and with the stem end either up or down. In this position, the apple can be effectively transferred to a machine for peeling and coring such as is shown in U.S. Pat. Nos. 3,586,081 and 3,586,151.

It is known in the prior art to provide an apple orientor having a plurality of receptacles, each with an eccentrically rotating wheel located in the bottom of the cup as shown in U.S. Pat. Nos. 4,746,001 and 4,169,528. It is also known in the prior art to provide spring loaded wire fingers such as shown in U.S. Pat. Nos. 3,586,081, 3,738,474 and 4,746,001.

It is also known in the prior art to provide a large diameter wheel which extends upwardly above the receptacle to contact the side of the apple as shown in U.S. Pat. No. 4,169,528. It is also known in the prior art to provide a large wheel extending above the surface of the apple receptacle which contains protuberances which make contact with the side of an apple lying crosswise in the receptacle. Such an apparatus is shown in U.S. Pat. No. 4,746,001.

It is known in the prior art to provide rotating eccentric wheels in the bottom of each receptacle to aid in turning the apple to its desired orientation. In the intended rest position with the core extending vertically and with either the stem or the blossom end pointing downwardly, the stem or blossom indent is reached and the rotating eccentric wheel beneath the apple can no longer contact the apple and the apple remains in its vertically oriented position. The prior art systems have approached the problem of orienting elongated apples, but those prior art systems nevertheless have considerable room for improvement. For example, the fingers used in some prior art orienting systems must be constantly adjusted to avoid disorienting an already oriented apple. The use of larger wheels extending above the receptacle does not contact longer apples sufficiently to turn them as effectively as the present invention.

SUMMARY OF THE INVENTION

In accordance with this invention, one or more vibrating agitators is provided which lies above the receptacle and which constantly agitates the apple by contacting the surface of the apple until the apple is oriented. When the apple has been oriented, it settles into the receptacle. In this position, the indent at either the stem or blossom end of the apple lies over the eccentric wheel in the bottom of the receptacle and the eccentric wheel does not contact the apple. In this position, the vibrating agitator is also not able to contact the apple and the apple remains at rest in the desired position for transfer to the peeling and coring apparatus.

A primary object of the present invention is to provide an orientor particularly suitable for use in orienting elongated apples wherein the apple is constantly agitated until it is oriented.

Another object of the invention is to provide an apple orientor which vigorously agitates elongated as well as round apples by using a combination of vibrational and rotational motion and achieves the desired orientation quickly.

A further object of the invention is to provide an apple orientor which vigorously agitates each apple until it is in its desired oriented position but wherein each apple is maintained in the space directly above a desired receptacle, and is not thrown off the apparatus.

Yet another object of the invention is to provide an agitational motion, which includes vibration and rotation, to orient elongated apples but transmits only a modest amount of vibration to the apple support mechanism itself.

Other objects and advantages of the invention will become apparent from the following description of the preferred embodiment and the drawings wherein.

BRIEF DESCRIPTION OF THE DRAWINGS

FIG. 2 is a plan view of a portion of the orienting mechanism without an apple shown;

FIG. 3 is a side elevational view of a single receptacle with an apple properly oriented by the mechanism of the present invention;

FIG. 4 is a sectional view of one of the agitating spools according to the present invention, showing the longitudinal axis through the center of the spool as well the axis along which an axle is mounted;

FIG. 5 is a side elevational view of the front of the spool shown in FIG. 4;

DETAILED DESCRIPTION OF THE DRAWINGS

Figure 1:
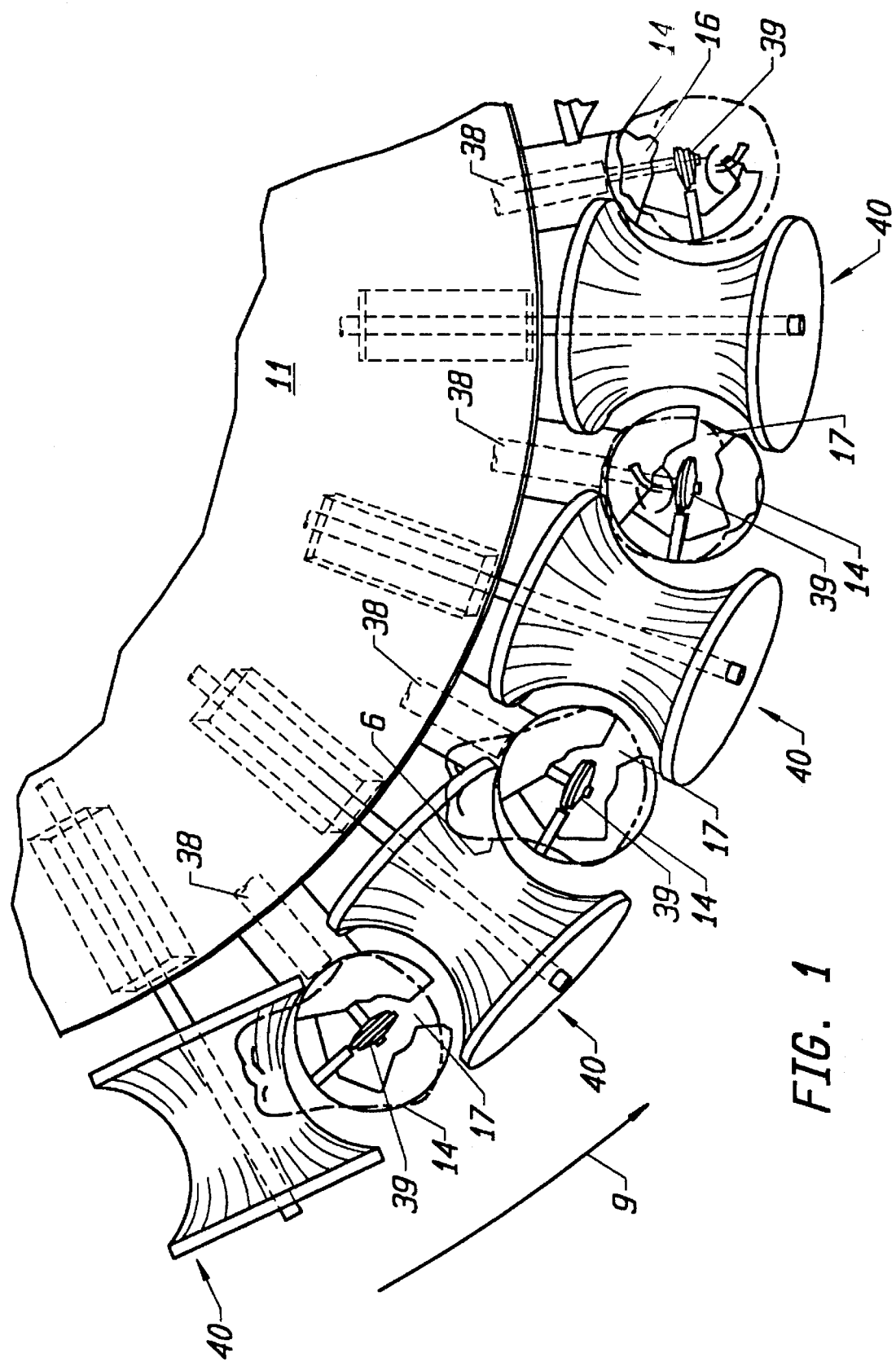
FIG. 1 is a plan view of a portion of the orienting apparatus showing several receptacles and apples.

FIG. 1 shows a circular conveyor plate 11 mounted for rotation by a central drive shaft (not shown). The conveyor plate includes a plurality of apple carrying receptacles each indicated as 14, each of which includes a frusto-conical side wall 16 and an open bottom 17. Apples are fed into the receptacles at a feeding station as the plate 11 turns in a counterclockwise direction viewed from above as shown by directional arrow 9. These components of the apparatus are shown in U.S. Pat. No. 4,746,001 owned by the assignee of this present invention.

A pair of eccentric wheels shown generally as 39 is mounted on a first shaft 38 which is rotatably mounted on the underside of support 11. Eccentric wheels 39 are carried in a position below the open bottom of receptacle 14. Wheels 39 assist in rotating and turning unoriented apples. The drive for each of the shafts 38 is shown in greater detail in U.S. Pat. Nos. 4,746,001 and 4,169,528, both owned by the assignee of this invention.

Referring to FIG. 3, an apple 7 is shown oriented in its desired position with its stem end pointing downwardly. When the apple is so oriented, the indent adjacent the stem lies directly above eccentric wheels 39, which prevents wheels 39 from contacting the surface of the apple and rotating or turning the apple out of its oriented position. It is to be understood that an alternate suitable orientation for apple 7 is to have its blossom end 8 pointing downwardly in which case the indent adjacent the blossom lies directly above eccentric wheels 39.

As shown best in FIG. 2, agitator means shown generally as 40 includes a first movable member or spool 41 and a second movable member or spool 42. In the preferred embodiment shown in FIG. 2, each of the movable members 41 and 42 comprises a generally concave shaped spool.

Referring to FIGS. 4 and 5, spool 41 is shown in greater detail. Spool 41 has a longitudinal axis A which extends through the center of spool 41. Axis A in FIG. 5 lies at the intersection of center lines A-1 and A-2.

An off-center mounting means referred to generally as 70 comprises an axle 71 (FIG. 2) which extends through a passageway 72 formed in spool 41 and extending through the entire length of spool 41. In the embodiment shown in FIGS. 4 and 5, passageway 72 has a central axis X which is spaced apart from longitudinal axis A as shown in FIG. 5 and which is not parallel to longitudinal axis A as shown best in FIG. 4. Referring to FIG. 5, central axis X is located at the intersection of centerlines X-1 and X-2. The distance between centerline A-2 of spool 41 and centerline X-2 of passageway 72 represents the degree of eccentricity to be exhibited in the motion of spool 41 as it is rotated on axle 71. That distance is preferably 3/16 inch. Referring to FIG. 4, the extent to which axis A and axis X are inclined relative to each other affects the degree to which spool 41 will wobble as axle 71 rotates. In the embodiment shown in FIGS. 4 and 5, spool 41 includes both a wobble characteristic and eccentric characteristic.

As shown best in FIG. 3, during operation spools 41 and 42 are driven in the same rotational direction as shown by arrows 43 and 44, respectively. The concave surface 45 of spool 41 is preferably textured or roughened in some manner to increase frictional contact with the surface of apple 7. The rotational motion of spools 41 and 42 rotates, lifts and helps turn apple 7. We have found that suitable materials for spools 41 and 42 include polyethylene, polypropylene, nylon and delrin.

Figure 6:
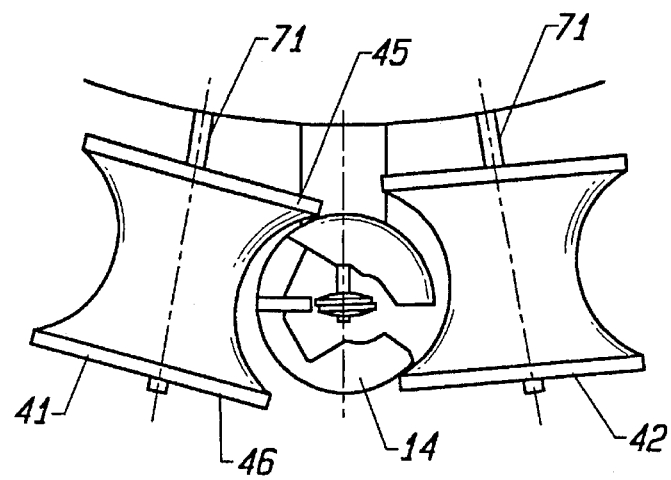
FIGS. 6, 7 and 8 are each a plan view of one receptacle, showing the relative positions of the agitator spools according to the present invention as they go through their rotational cycle.
Figure 7:
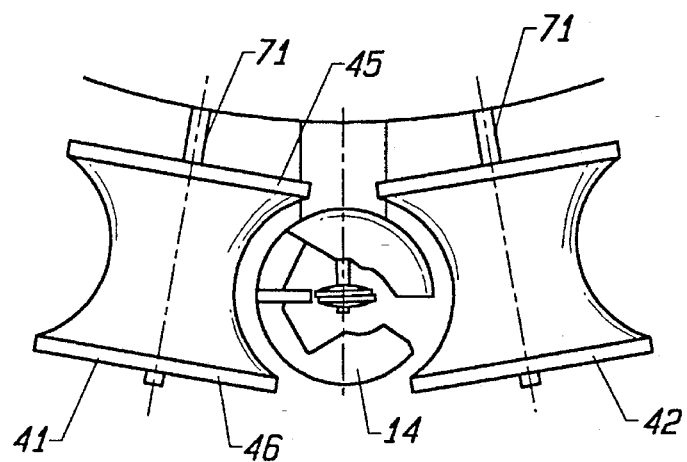
Figure 8:
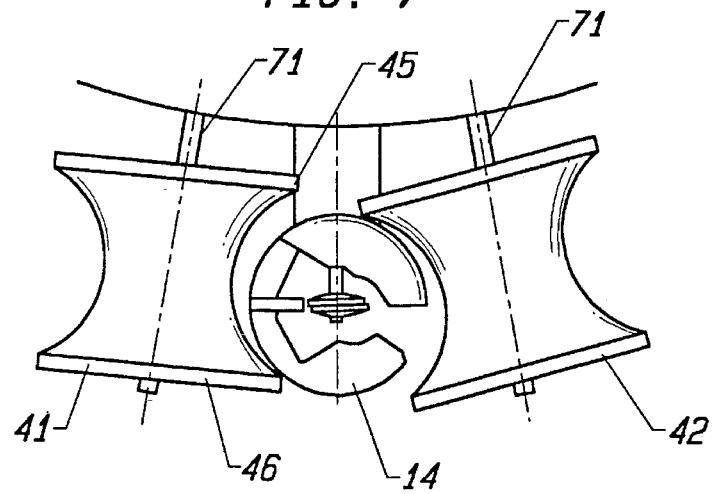
Figures 9, 10:
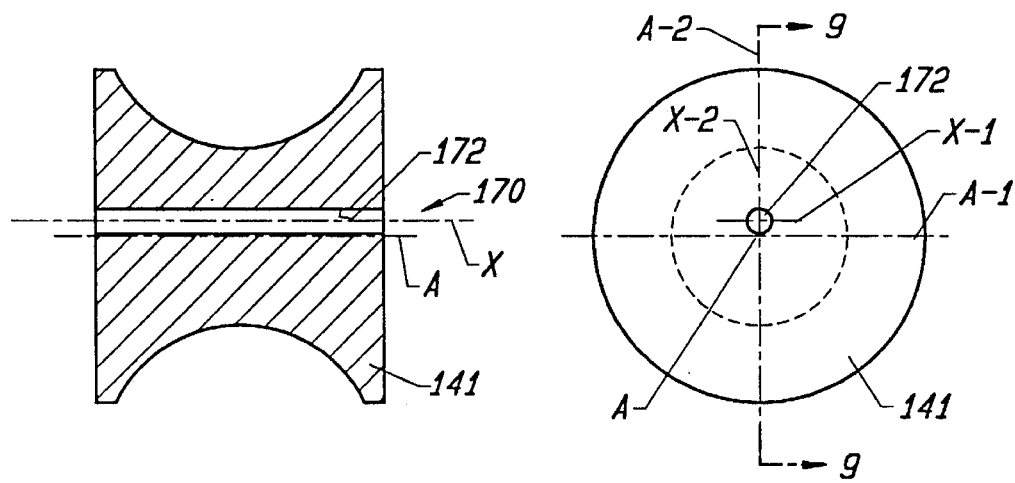
FIG. 9 is a sectional view of an alternate design spool utilizing an eccentric mounting for the axle.
FIG. 10 is a front elevational view of the spool shown in FIG. 9.
Figure 11:
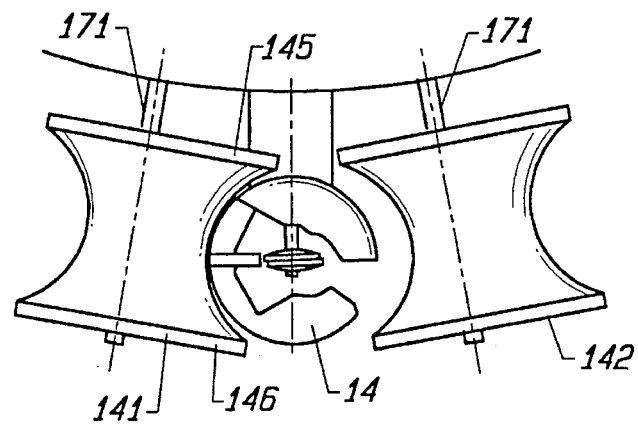
FIGS. 11 and 12 show in plan view the operation of a pair of eccentric spools as shown in FIGS. 9 and 10 moving through a rotation.
Figure 12:
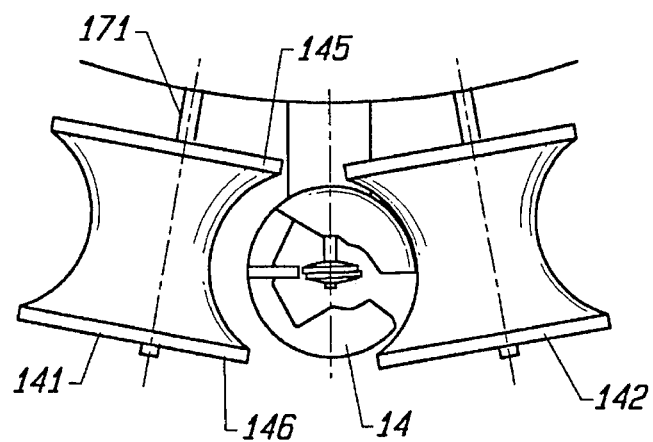

FIGS. 6, 7 and 8 show the motion characteristics of spools 41 and 42. As the spools 41 and 42 are rotated by their drive axles 71, each spool will "wobble" as, for example, spool 41 will move from the position shown in FIG. 6 wherein the first end 45 of spool 41 is closest to the center of receptacle 14 and wherein the second end 46 of spool 41 is at its further distance from the center of receptacle 14. In the position shown in FIG. 7, the first and second ends 45 and 46 of spool 41 are located equidistant from the center of receptacle 14. In the position shown in FIG. 8, the first end 45 of spool 41 is at its furthest distance from the center of receptacle 14 whereas the second end 46 of spool 41 is at its closest distance to the center of receptacle 14. As spool 41 is driven by axle 71, at approximately 100 revolutions per minute, it vibrates relative to the surface of an apple located in receptacle 14 and continuously agitates and rotates the apple by contacting the surface of the apple until the apple is rotated to a position as shown in FIG. 3, at which point the concave surfaces of spools 41 and 42 no longer contact the surface of the apple.

Although the preferred embodiments shown in the drawings include a spool on each side of any given receptacle, it is to be understood that the spirit of the present invention would include the use of a single spool on one side of a receptacle and a stationary concave surface on the other side of the receptacle. However, such a variation would not perform as well as the preferred embodiment. It is also to be understood that, while the preferred embodiment utilizes concave shaped spools, the present invention also contemplates the use of alternate members rather than spools, such as obround cylinders, for example. The design requirement is that the member be positioned above the receptacle and be capable of continuously vibrating or oscillating and rotating in a manner to constantly agitate the apple until the apple is properly oriented in receptacle 14.

As used herein and in the claims, the term "off-center," as used to describe the various ways of connecting the drive axle 71 to the spools 41,42, includes varying degrees of "wobble" and "eccentricity." The embodiment shown in FIGS. 2–8 includes a combination of "wobble" and "eccentricity" whereas the embodiments described in FIGS. 9–16 have different combinations of those characteristics as is described below.

Referring to FIGS. 9–12, a second embodiment of spool 141 is shown utilizing an alternate mounting means 170. The embodiment shown in FIGS. 9–12 is an "eccentric" mounting without any "wobble" characteristic. As shown best in FIG. 10, the longitudinal axis A extends through the center of spool 141 and is located at the intersection of centerlines A-1 and A-2. A passageway 172 extends through the entire length of spool 141. Passageway 172 has a centerline X which is located at the intersection of centerlines X-1 and X-2 of FIG. 10. Drive axles 171 extend through passageways 172. Axle 171 has its center axis X parallel to longitudinal center axis A of spool 141 but spaced apart from longitudinal axis A as shown best in FIG. 9. This geometry results in the eccentric motion shown by FIGS. 11 and 12 as spools 141 and 142 are rotated. In the position shown in FIGS. 11, the upper end 145 of spool 141 is equidistant from the center of receptacle 14 with the lower end 146 of spool 141. In the position shown in FIG. 11, spool 141 is at its closest position to the center of receptacle 14 and spool 142 is at its furthest position from the center of receptacle 14. As the rotation of axle 171 continues, since spool 141 is eccentrically mounted, it will move to a position where it is at its maximum distance from center of receptacle 14 shown in FIG. 12 and spool 142 in the preferred embodiment will be at its closest position to the center of receptacle 14. In this manner, the spools will move in a pattern that constitutes a side-to-side vibration and a rolling and lifting action against an apple carried in receptacle 14 but without the wobble characteristic shown in FIGS. 6–8.

Figure 13:
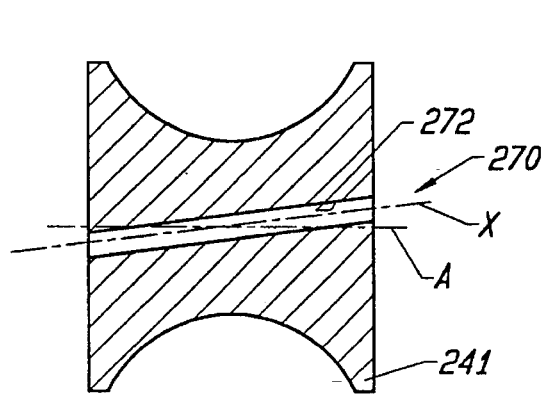
FIG. 13 is a sectional view of yet another embodiment of the agitating spool having a wobble mounting according to the present invention.
Figure 14:
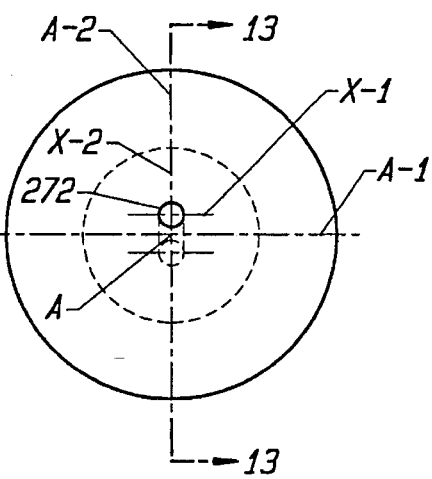
FIG. 14 is a front elevational view of the spool shown in FIG. 13.

FIGS. 13–16 show a further embodiment in which spool 241 and mounting means 270 create a "wobble" and rotational motion without the "eccentric" motion shown in FIGS. 9–12. Spool 241 has a longitudinal center axis A which lies at the intersection of centerlines A-1 and A-2 as shown in FIG. 14. Passageway 272 extends through the length of spool 241 and has a center axis X which lies at the intersection of lines X-1 and X-2 of FIGS. 14. Drive axles 271 extend through passageway 272 and the center axis X of axle 271 forms an acute angle with and intersects axis A as shown in FIGS. 13 and 14. This embodiment provides a "wobble" motion (as well as a rotational and lifting motion provided by spools 241 and 242 and wheels 39) without "eccentric" motion.

Figure 15:
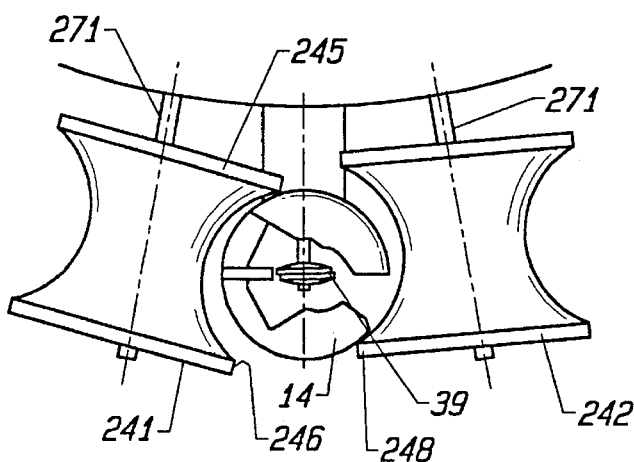
FIGS. 15 and 16 are plan views showing a pair of spools such as shown in FIGS. 13 and 14 going through a rotational cycle.
Figure 16:
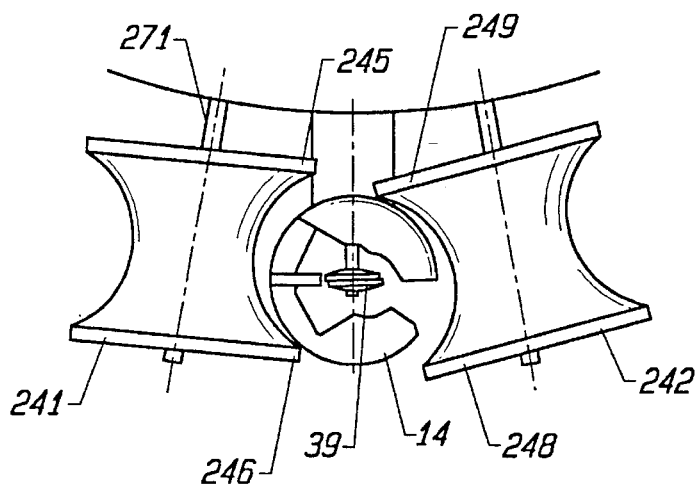

As shown in FIGS. 15 and 16, spool 241 exhibits a "wobble" motion wherein the first end 245 of spool 241 is at its position closest to the center of receptacle 14 when the second end 246 is at its furthest distance from the center of receptacle 14. Upon rotation of axle 271 to the position shown in FIG. 16, the first end 245 of spool 241 is at its furthest distance from the center of receptacle 14 at the same instant that the second end 246 is at its closest position to the center of receptacle 14.

With respect to the timing between spools 241 and 242, it is preferred that, when the first end 245 of spool 241 is closest to the center of receptacle 14, that the second end 248 of spool 242 also be at its closest position to the center of receptacle 14. In this manner, the space between the second or lower ends 246 and 248 is kept to a minimum so that the apple cannot be bounced through the space formed between ends 246 and 248 of spools 241 and 242. Similarly, at the position shown in FIG. 16, when the second or lower end of spool 241 is at its closest point to the center of receptacle 14, it is preferred that the first or upper end 249 of spool 242 be at its closest position to the center of receptacle 14.

We have found that the dimensions specified below have been the most efficient. Each spool is 5 inches in diameter at the outer flange and is 4 inches wide. Each spool is concave in shape with a dimension of 2.75 inches in diameter at the center of the spool. The radius of the concave surface is 2 inches. Each receptacle or orientor cup is approximately 3.25 inches in diameter. The axles of spools 41 and 42 are mounted slightly above the upper surface of receptacle 14 as shown best in FIG. 3.

What is claimed is:

1. In an apple orientor used to orient round and elongated apples with either the stem end or the blossom end pointed downwardly, including a support movable over a path, at least one receptacle in said support having an open bottom, the improvement comprising:

agitator means carried above said receptacle comprising at least one movable member which continuously agitates, lifts and rotates said round and elongated apples by contacting a downwardly facing surface and one side surface of each of said apples until each apple is oriented, and drive means connected to said agitator means.

2. The apparatus of claim 1 wherein said agitator means comprises a concave shaped spool and further comprising off-center mounting means for connecting said spool to said drive means.

3. The apparatus of claim 1 wherein said agitator means comprises first and second concave shaped spools and further comprising off-center mounting means for connecting said spools to said drive means.

4. The apparatus of claim 3 wherein said first and second concave shaped spools are located above opposite sides of said receptacle and rotate in the same rotational direction.

5. In an apple orientor used to orient apples with either the stem end or the blossom end pointing downwardly, including a support movable over a path in a horizontal plane, at least one receptacle in said support having an open bottom and a frusto-conical side wall, a first shaft rotatably mounted on the underside of said support and extending to a position below the open bottom of said receptacle, and a first eccentric wheel mounted on said first shaft for rotation in a vertical plane in said open bottom, the improvement comprising:

agitator spool means carried above said receptacle, said agitator spool means comprising first and second concave shaped spools having first and second spaced longitudinal axes, respectively, drive means connected to said agitator spool means to cause said first and second concave shaped spools to rotate, and off-center mounting means for connecting said first and second concave shaped spools to said drive means so that said spools will agitate and rotate an apple in said receptacle until said apple is oriented with either its stem end or its blossom end pointing downwardly.

6. The apparatus of claim 5 wherein said off-center mounting means comprises first and second axles extending through said first and second spools, respectively, wherein said first and second spools each have a longitudinal axis extending through its center, and wherein each of said first and second axles intersects with and forms an acute angle with the longitudinal axis of said first and second spool, respectively.

7. The apparatus of claim 5 wherein said off-center mounting means comprises first and second axles extending through said first and second spools, respectively, wherein said first and second spools each have a longitudinal axis extending through its center, and wherein each of said first and second axles is parallel to and spaced apart from said first and second longitudinal axes, respectively.

8. The apparatus of claim 5 wherein said off-center mounting means comprises first and second axles extending through said first and second spools, respectively, wherein said first and second spools each have a longitudinal axis extending through its center, and wherein each of said first and second axles is spaced apart from and is not parallel to said first and second longitudinal axes, respectively.

* * * * *